US006606843B1

United States Patent
Anstey et al.

(10) Patent No.: US 6,606,843 B1
(45) Date of Patent: Aug. 19, 2003

(54) STRUCTURE FOR RELIABLY FEEDING AND SPREADING NET WRAP MATERIAL, OF A WIDTH GREATER THAN THE WIDTH OF A ROUND BALER CHAMBER, SO AS TO COVER OPPOSITE END SEGMENTS OF A BALE LOCATED IN THE CHAMBER

(75) Inventors: Henry Dennis Anstey, Ottumwa, IA (US); Nissim Mass, Haemek (IL); Yuval Lieber, D. A. Megido (IL); Zvi Paz, Haemek (IL)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/532,117

(22) Filed: Mar. 21, 2000

(51) Int. Cl.[7] ............................................. B65B 53/00
(52) U.S. Cl. .......................................... 53/556; 53/587
(58) Field of Search ........................ 53/556, 587, 588, 53/118, 211, 215, 441, 389.4

(56) References Cited

U.S. PATENT DOCUMENTS

| 4,790,125 A | * | 12/1988 | Merritt | 53/587 |
| 4,917,008 A | * | 4/1990 | Wildenberg | 53/556 |
| 5,090,182 A | * | 2/1992 | Bethge | 53/556 |
| 5,103,621 A | * | 4/1992 | Matsumoto | 53/556 |
| 5,996,307 A | * | 12/1999 | Niemerg et al. | 53/118 |
| 6,006,504 A |   | 12/1999 | Myers et al. | 53/556 |

* cited by examiner

Primary Examiner—Eugene Kim
Assistant Examiner—Sameh Tawfik

(57) ABSTRACT

A large round baler is equipped with a net wrapping mechanism for wrapping a bale with net material that is wider that the width of the baling chamber so that the net material extends over the opposite ends of the bale. The baler has a baling chamber defined in part by a plurality of bale-forming belts mounted in side-by-side relationship on a plurality of belt support rolls extending between opposite sidewalls of the baling chamber. The net material is fed beneath the discharge gate of the baler to a crop inlet located between a lower front belt support roll carried by the discharge gate, the net being carried into the baling chamber by a fore-and-aft runs of the belts that extend between a lower rear and the lower front belt support roll, and carry the net along a guide surface defined by a plurality of channel members respectively located beneath the fore-and-aft runs of the belts. In order to ensure that the net material arrives at the baling chamber at width greater than that of the baling chamber, spiral rings are mounted at opposite ends of the lower rear belt support roll and spreader rings are mounted at the opposite ends of the lower front belt support rolls, the spiral rings being located outboard relative to the spreader rings, with a major portion of the spreader rings being located outboard of the opposite sidewalls of the baling chamber. In order to keep rogue or stray crop stems from interfering with the net material so as to prevent it from being spread to its full length and fed, shielding is provided inside the baling chamber at a location above the lower rear roll. Wrap around shields are provided to shield the spreader rings from crop that is delivered into the baling chamber and various other structures are provided for preventing the accumulation of rogue or stray crop in the vicinity of the spreader rings and other areas in the path of net travel.

11 Claims, 9 Drawing Sheets

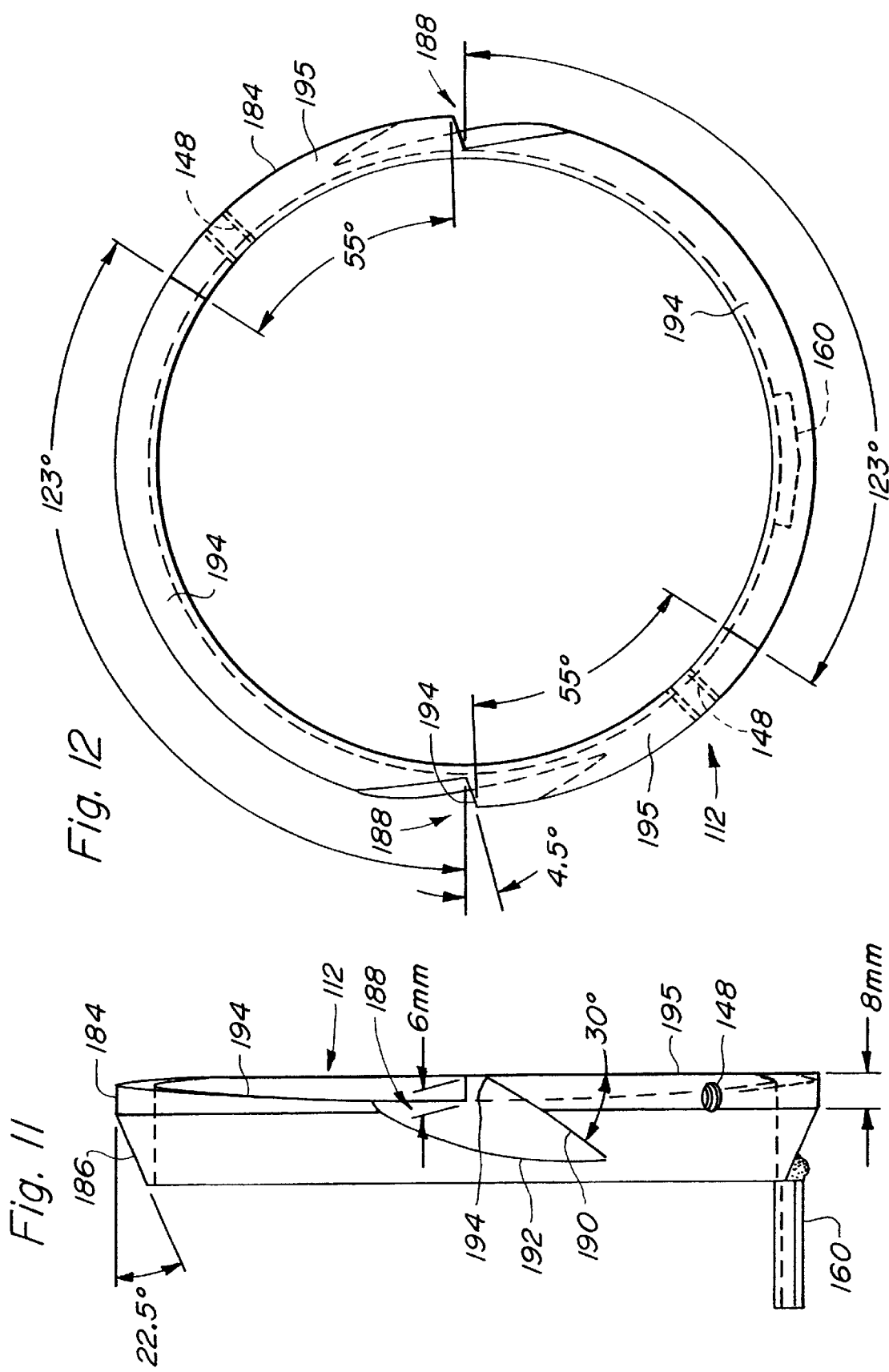

STRUCTURE FOR RELIABLY FEEDING AND SPREADING NET WRAP MATERIAL, OF A WIDTH GREATER THAN THE WIDTH OF A ROUND BALER CHAMBER, SO AS TO COVER OPPOSITE END SEGMENTS OF A BALE LOCATED IN THE CHAMBER

BACKGROUND OF THE INVENTION

The present invention relates to devices for wrapping net material around large round bales located in a baling chamber and more specifically relates to structure for keeping net wrap material at its dimension wider than the baling chamber so that the net material becomes wrapped over outer, opposite end segments of the ends of the bale.

U.S. Pat. No. 6,006,504, issued on Dec. 28, 1999 relates to a wrapping device of the above-mentioned type. While this patent acknowledges the importance of having the net material spread to its full width at the point of its feeding into the crop inlet of the baling chamber, it is somewhat lacking in that regard. Also, operation of a baler constructed in accordance with the patented structure has revealed shortcomings in its construction which permit crop materials to directly interfere or to accumulate and then interfere with the spreading and feeding operations of the net. It has even been found that in some instances the interfering crop materials will cause rips or tears in the net wrap material. This interference can take place at any point along the entire feed path for the net material extending beneath the baler discharge gate and into the crop inlet, but particularly in the vicinity of the lower rear and lower front belt support rolls of the discharge gate.

SUMMARY OF THE INVENTION

According to the present invention, there is provided a net material delivery structure which represent an improvement over the structure disclosed in the above-identified patent.

An object of the invention is to provide a net wrap feeding assembly which is capable, in a variety of crop conditions, of effectively feeding net material, at a width greater than that of the baler chamber, into the crop inlet of a large round baler so that a bale located there will be wrapped with the net extending over opposite end segments of the bale.

A more specific object of the invention is to provide a net wrap feeding assembly which includes various components which cooperate to keep incoming crop flow as well as stray or rogue crop material from interfering with the spreading and delivery of the net material to the baling chamber.

Another object of the invention is to provide aggressive net spreader spiral rings, on the opposite ends of the lower rear discharge gate roll, which spread the net wrap material to its full width and thus act to place the wrap material in a more suitable disposition for being engaged a spread by aggressive wrap material spreader rings, on the ends of the lower front belt support roll of the discharge gate.

Another object of the invention is to provide the opposite ends of the lower front discharge gate roll with aggressive spreader rings which not only spread the net to a width greater than the width of the baling chamber but also act to wipe crop out of the vicinity of the ring so as to prevent accumulation of the crop with its attendant disruption of the feeding of the net into the baling chamber.

Yet another object of the invention is to provide wrap around shields which protect the spreader rings at the opposites ends of the lower front discharge gate roll from incoming crop flow as well as the same time providing an open rear area for crop to be expelled by operation of a wiper carried by the spreader ring, and additionally for defining an open path for net wrap material to enter and go around the shielded area of the spreader rings.

Still another object of the invention is to provide a roll scraper, at the back side of the lower front gate roll, which acts to deflect stray or rogue pieces of crop away from the spreader rings at the opposite ends of the gate roll.

Another object of the invention is to provide the lower front gate roll with spiral strips that act to increase the aggressiveness between the roll and the belts so that crop is carried through the nip area, chop crop when it engages the roll scraper, auger rogue or stray pieces of crop inwardly away from the spreader rings at the opposite ends of the roll, and to lift and shake the bale forming belts so that stray or rogue crop pieces carried by the belts will fail between the belts.

A further object of the invention is to provide belt guide washers on the net material guide pan structure in the vicinity of the nip between the belts and the lower front discharge gate roll so that the next wrap material can pass over the tops of the guide washers without being inhibited from being spread by the spreader rings provided at the opposite ends of the lower front roll.

These and other objects will become apparent from a reading of the ensuing description together with the appended drawings.

BRIEF DESCRIPTION OF THE DRAWINGS

FIG. 11 is a front elevational view of the right-hand spreader ring.

FIG. 12 is a right side elevational view of the right-hand spreader ring.

DESCRIPTION OF THE PREFERRED EMBODIMENT

Initially, it is to be noted that various components are described as existing in pairs while only one of each pair is shown and it is to be understood that the absent component is the same as, or similar in construction to, or the mirror image of, the one shown.

Figure 1:
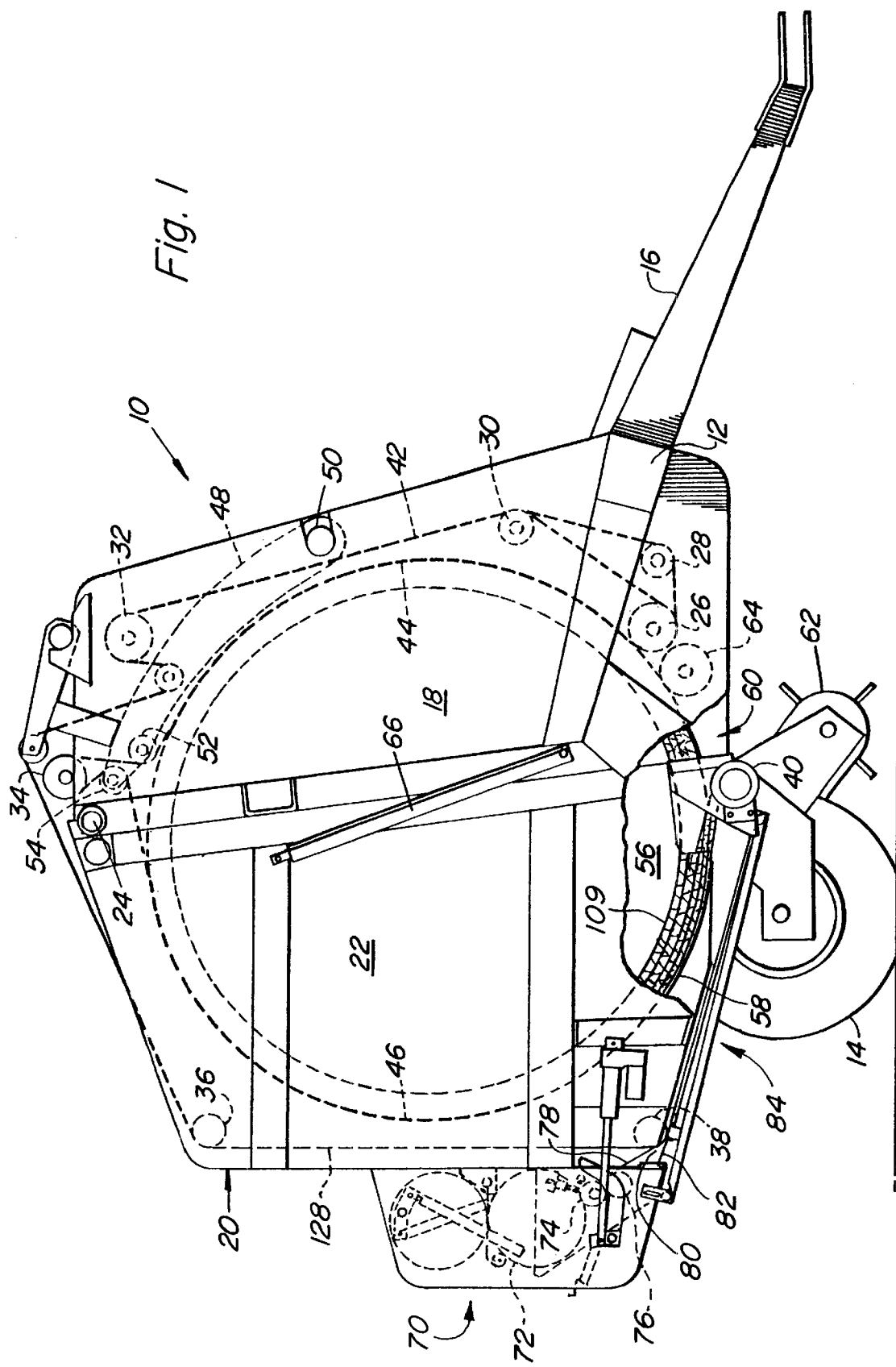
FIG. 1 is a right side elevational view of a large round baler equipped with a net wrapping assembly of the type with which the present invention is particularly adapted for use.

Referring now to FIG. 1, there is shown a baler 10 of the type for making large cylindrical bales and commonly called a large round baler. The baler 10 comprises a main frame 12 supported on a pair of ground wheels 14, of which only the left-hand ground wheel is shown. A draft tongue 16, which is adapted for being connected to a tractor, is secured to the main frame 12. A pair of transversely spaced vertical sidewalls 18 are joined to the frame 12 and have respective upright rears ends. A bale discharge gate 20 including opposite sidewalls 22 is vertically pivotally attached, as at 24, to upper rear locations of the sidewalls 18, the sidewalls 22 having forward ends which abut against the rearward ends of the sidewalls 18 when the gate 20 is in a lowered closed position as shown.

The pairs of sidewalls 18 and 22 rotatably support the opposite ends of a plurality of bale-forming belt support rolls adjacent the periphery of the sidewalls. Specifically, beginning at a lower central location of the sidewalls 18 and proceeding counterclockwise, there are mounted a driven roll 26, a lower front roll 28, an intermediate front roll 30, an upper front roll 32, and an upper rear roll 34; and continuing counterclockwise from an upper rear location of the gate sidewalls 22 there is mounted an upper rear roll 36, a lower rear roll 38 and a lower front roll 40. Located between the pairs of sidewalls 18 and 22 and supported in side-by-side relationship to one another across the various belt support rolls are a plurality of endless bale-forming belts 42. Except for some of the belts 42 which skip the lower front roll 28, the belts are trained so that they serially engage the rolls 26, 28, 30, 32, 36, 38, 40 and 34. A front run 44 of the belts 42 extends upwardly from the driven roll 26 to the roll 34. Similarly, a rear run 46 of the belts 42 extends upwardly from the lower front gate roll 40 to the roll 34. Mounted between rear end locations of a pair of rearwardly extending tensioning arms 48, which are vertically pivotally mounted, as at 50, to a mid-height location at the front of the sidewalls 18, are closely spaced, front and rear idler rolls 52 and 54, with the belt runs 44 and 46 cooperating with the sidewalls 18 and 22 to define an expansible baling or bale-forming chamber 56, closed at its top by the idler rolls 52 and 54, and here shown in a state of considerable expansion and containing a bale 58. When the chamber 56 is empty, the front and rear runs 44 and 46 of the belts 42 respectively converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54, the chamber 56 thus being wedge-shaped as viewed from the side. The bottom of the chamber 56 is provided with a crop inlet 60 extending between the driven roll 26 and the lower front gate roll 40. Crop products are introduced into the inlet 60 by a pickup 62 for being rolled into a bale, such as the bale 58 by the action of the front and rear runs 44 and 46 of the belts 42, which are respectively driven so as to travel toward and away from the inlet, and initially also by a starter roll 64 rotatably mounted in the sidewalls 18 adjacent to, and being driven in the same direction as, the driven roll 26 so that it operates to strip crop being carried downwardly by the front run of belts 44. As the bale 58 is being formed, the chamber 56 yieldably expands, to a predetermined size as shown, against the force established in the belts by a tensioning system including the pair of tensioning arms 48 together with a pair of tensioning springs (not shown) and a pair of hydraulic cylinders (not shown) coupled between the walls 18 and the arms 48 for resisting upward movement of the arms, in a manner well known in the art. A pair of gate cylinders 66 are provided for swinging the gate 20 upwardly, about the pivotal attachment 24, to an open position when it is desired to discharge the bale 58 onto the ground.

Mounted to the lower rear portion of the discharge gate 20 is a net wrap dispensing mechanism 70 in which is loaded a net material supply roll 72 which is located directly on a driven upper net material feed roll 74 that is located above and rearwardly of the axis of rotation of a lower feed roll 76. A length of wrap material 78 extends from the front surface of the net material supply roll 72, between the supply roll 72 and the net material feed roll 74 and then forwardly through a nip or bite defined by the upper and lower feed rolls 74 and 76, respectively. When a bale is being wrapped, as indicated in FIG. 1, the length of wrap material 78 extends on into the inlet 60 of the baling chamber 56 by way of a nip 80, defined by a pan 82 and the belts 42 where the latter pass about the lower rear belt support roll 38.

Figure 2:
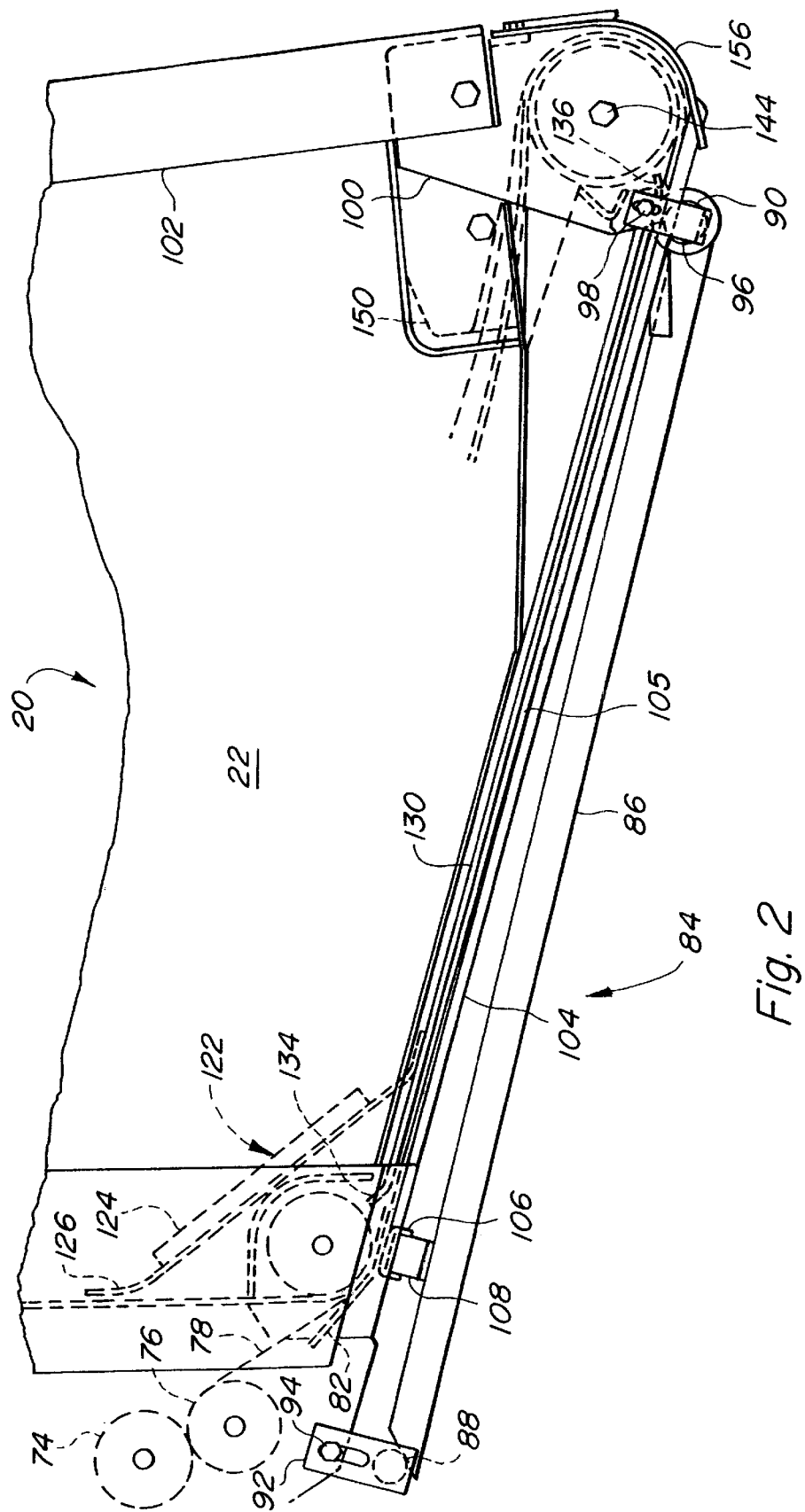
FIG. 2 is a right side elevational view showing an enlargement of that portion FIG. 1 including the lower portion of the discharge gate and the net wrap material feed structure extending beneath the gate, but with some parts omitted for clarity.
Figure 10:
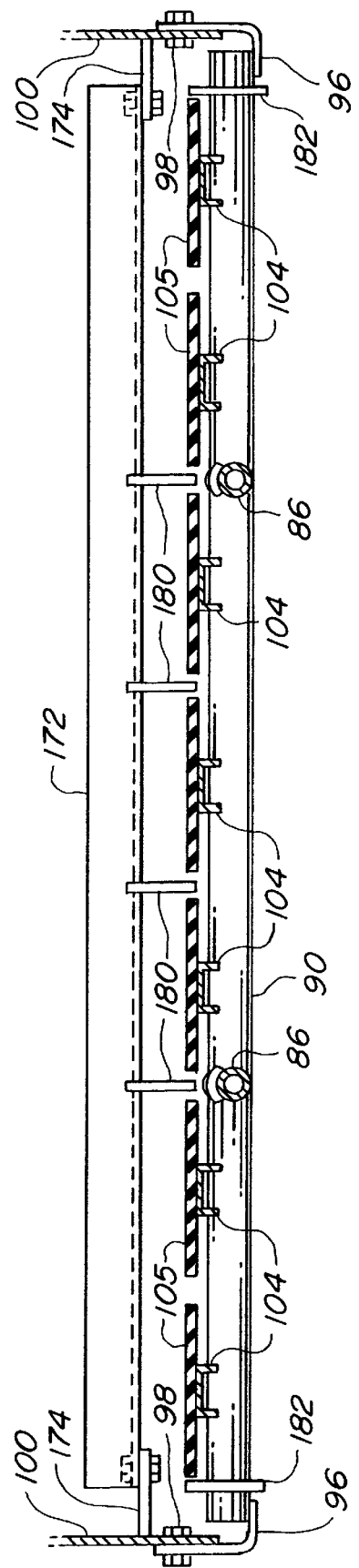
FIG. 10 is a vertical sectional view taken along line 10—10 of FIG. 8 showing the bale-forming belts, the support for the belts and the belt guides.

Referring now also to FIG. 2, it can be seen that the pan 82 forms part of a net material guide assembly 84 positioned beneath the discharge gate 20 and further comprising a support frame including a pair of fore-and-aft extending members 86 (FIG. 10) having their rear ends respectively fixed adjacent opposite ends of a cylindrical rear cross member 88 and converging forwardly to transversely spaced locations where they are connected to a middle portion of a cylindrical front cross member 90. A pair of straps 92 are respectively fixed to opposite ends of the rear cross member 88 and are secured, as by bolts 94, to the opposite sides of the housing of the dispensing mechanism 70. Similarly, a pair of straps 96 are respectively fixed to opposite ends of the front cross member 90 and secured, as by bolts 98, to respective plates 100 that are welded to outer lower portions of posts 102 forming forward stiffening members of the opposite sidewalls 22. A plurality of longitudinally extending, transversely spaced, downwardly opening channel members 104 are respectively located one each under each of runs 105 of the belts 42 (see FIG. 10), which extend fore-and-aft between the rolls 38 and 40, with a forward section of each of the members 104 being joined to and extending forwardly beyond the front cross member 90 to respective locations beneath the lower front gate roll 40, and with a rear end of each of each of the members 104 being joined to a forward side of a transverse, downwardly opening channel member 106 located directly beneath the lower rear gate roll 38. An upwardly bowed leaf spring 108 bridges, and has opposite ends engaged with, the pair of fore-and-aft extending members 86, with a central portion of the leaf spring 108 being coupled to a central location of the channel member 106, in a manner not shown. It is noted that the pan 82 is secured to the top of the channel member 106 and to the rear ends of the channel members 104 as well, and that the leaf spring 108 functions to urge the pan 82 against the belts 42 in the vicinity of the belt support roll 38 so that a free end of the length of net 78 is easily caught at the initiation of the wrapping procedure.

Thus, it can be seen that after passing through the nip 80, the length of net material 78 is supported on the upper flat surfaces of the longitudinal channels 104 beneath the longitudinal runs 105 of the belts 42. In fact, the belt runs 105 act to carry the length of net material 78 around the roll 40 and into the baling chamber 56 where it becomes wrapped about the bale 58 which, during wrapping operation, is being rotated clockwise within the chamber 56 by the movement of the belt runs 44 and 46.

The net material supply roll 72 is longer than the baling chamber 56 is wide, that is to say, the length of the roll 72 is greater than the distance between the sidewalls 18 or 22 of the baling chamber 56. It is desirable to have the length of net material 78 at its full width when it enters the baling chamber 56 so that outer marginal portions of the net becomes folded over the opposite ends of the bale 58, as shown at 109 in FIG. 1, and to this end the opposite ends of each of the belt support rolls 38 and 40 are respectively defined by net spreading devices, with only the right-hand device of each roll being shown. The left-hand spreading devices are mirror images of the right-hand spreading devices. Further, it is to be noted that the sidewalls 22 of the discharge gate each have a lower, fore-and-aft extending edge that is above the upper surfaces of the channels 104 so as to permit the length of net material 78 to be spread outwardly beyond the bottom edges of the sidewalls 22.

Figure 3:
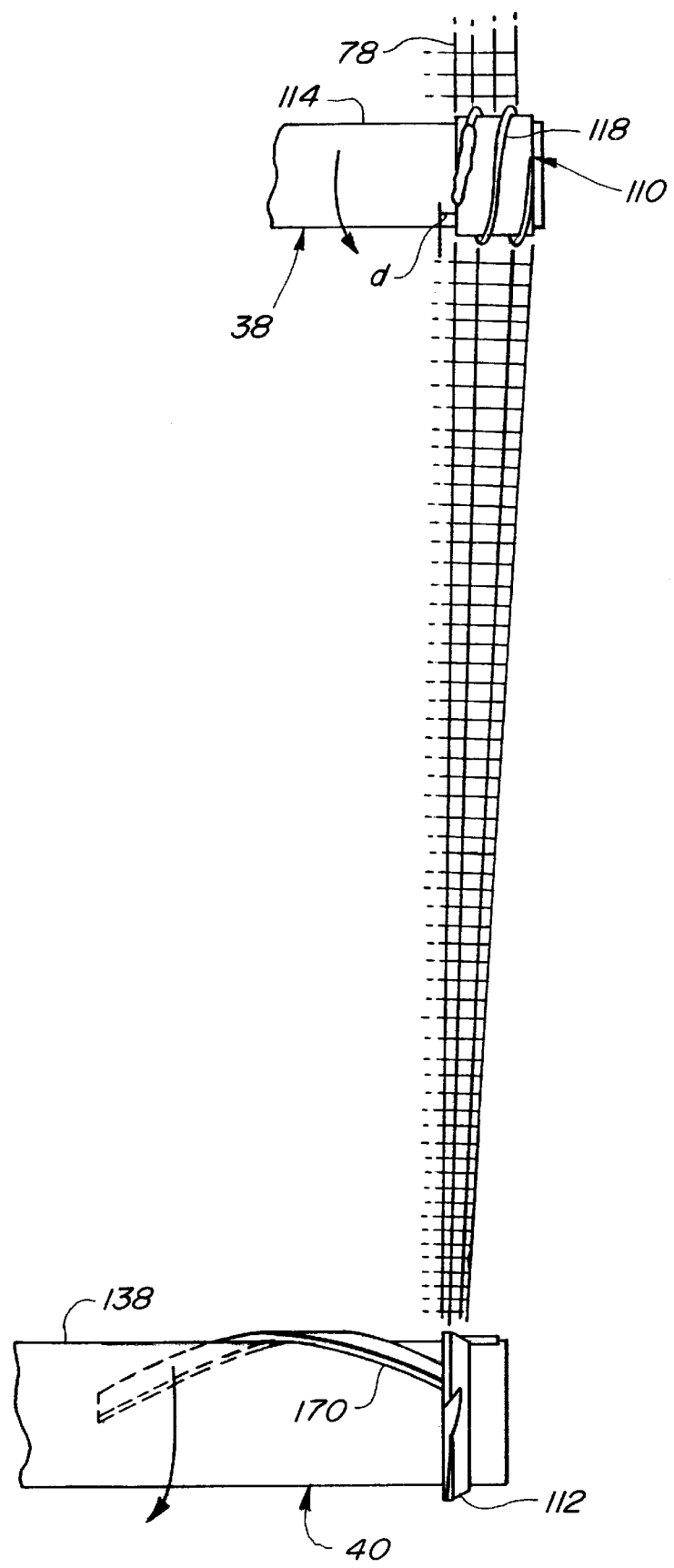
FIG. 3 is a somewhat schematic bottom view showing the relationship between the right-hand spiral ring and the right-hand spreader ring.
Figure 4:
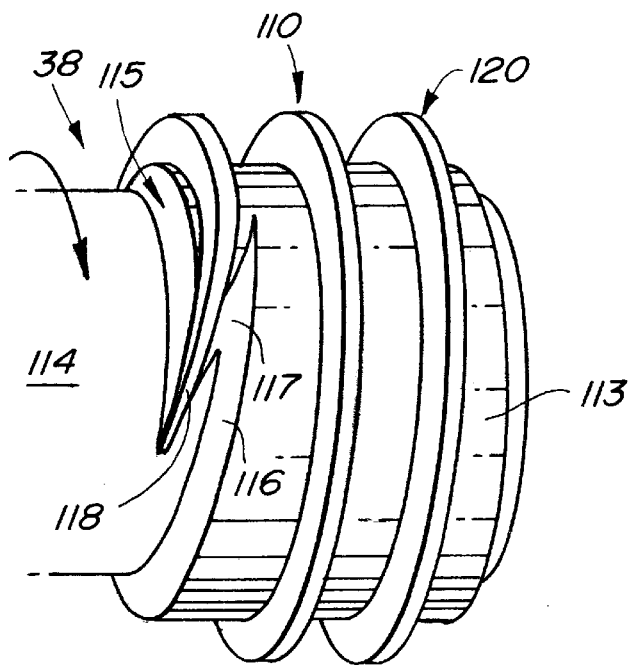
FIG. 4 is perspective view of the right-hand spiral ring.
Figure 5:
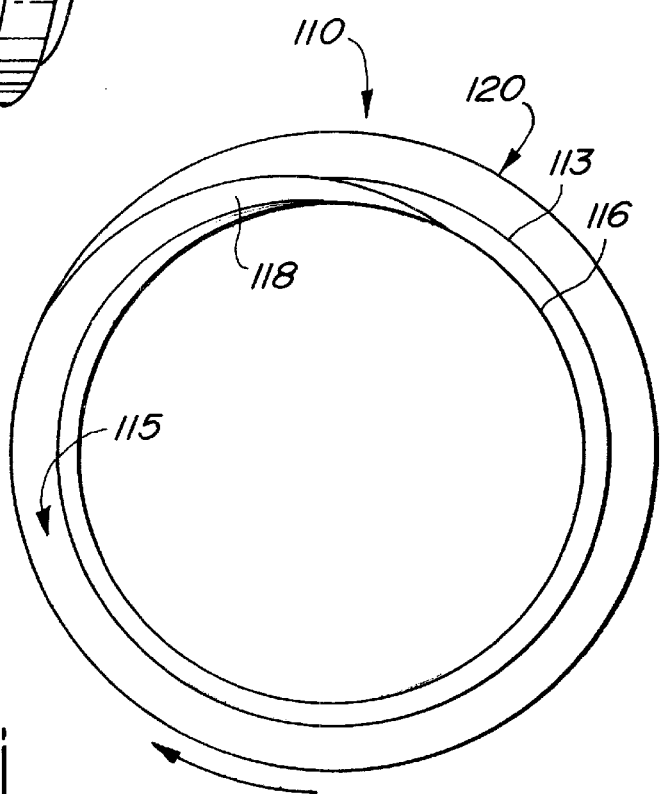
FIG. 5 is a left end view of the spiral ring shown in FIG. 4.

With reference now also to FIGS. 3 through 5, it can be seen that the spreading devices defining opposite ends of the lower rear gate roll 38 are in the form of spiral rings 110, and that the spreading devices defining opposite ends of the lower front roll 40 are in the form of spreader rings 112. The spiral rings 110 include a cylindrical sleeve 113 received on opposite ends of a central cylindrical core 114 of the roll 38 and secured in place by set screws or the like (not shown) received in threaded holes provided in the sleeve 113. Each sleeve 113 includes a chamfered inner end 115 having a section that is angled outwardly at an angle of approximately 10° from a vertical plane intersecting the rotational axis of the spreader ring 110 at a right angle so as to define a lead-in surface 116. The lead-in surface 116 blends into and forms an outer side of a generally v-shaped notch 117 that gradually becomes shallower so that its outer end is at the outer diameter of the sleeve 113. The inside end of the sleeve 113 includes a portion that diverges from, and parallels a portion of the lead-in section 116, where the latter blends into one side of the notch 117, the diverging portion of sleeve forming a leading end or nose 118 of a spiral rib 120, the nose having a surface which blends into a second side of the notch 117. The spiral rib 120 is of a hand for engaging longitudinal strands of the adjacent side portion of the length and wrap material 78 and moving the side portion outwardly beneath the discharge gate sidewalls 22. It is noted that the nose 118 begins at the inside diameter of the sleeve 113, at a location inwardly of a major portion of the inner end of the sleeve, and, within an angular distance of about 90°, rises to the full height of the rib 120 which continues constant over the remainder of the length of the sleeve. Thus, the nose or leading end 118 of the rib 120 starts at the outer diameter of the cylindrical roll core 114 so as to effectively lift longitudinal strands of the net material 78 from the surface of the roll core 114 and initiate outward movement of the adjacent side portion of the length of net material 78. Importantly, the surface speed of the spiral ring 110 is greater than the linear speed of the length of net material 78 so that the spiral rib 120 aggressively engages and moves the longitudinal net strands outwardly. While the particular spiral ring 110 described above does an excellent job of spreading the length of net material outwardly, other shapes could be used as long as they provide aggressive pick-up and outward feeding of the net material.

Figure 6:
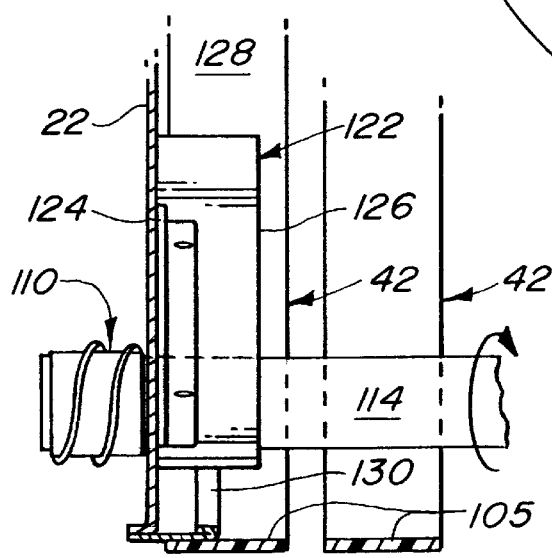
FIG. 6 is a front elevational view of the shield for preventing rogue or stray crop from passing sideways into the vicinity of the spiral ring.

The spiral rings 110 are outside the opposite sidewalls 22 and respective clearance gaps exists between the net pan 82 and the sidewalls 22 which permits rogue or stray crop stems, especially long stems from crops such as corn or cane, which have passed from the baling chamber 56 through gaps between the belt runs 46 into the void between the belt runs 46 and those runs of the belts 42 that extend about the periphery of the gate 20, to find their way outwardly through gaps or openings communicating this void with the area adjacent the spiral rings 110 and of the net guide pan 82 such as to interfere with the net path. Such interference has been found to cause the net to sometimes become torn or split and/or to block the net from spreading to full width resulting in the net not extending over the ends of the wrapped bale. In order to keep long stems of this rogue or stray crop from feeding out sideways between the outermost runs of the belts in the vicinity of the spreader spiral rings 110, shield structures 122 (see FIGS. 2 and 6) are angled across the lower rear corners of the discharge gate 20, with only the structure at the right-hand side of the gate 20 being shown. Specifically, each shield structure 122 includes a support 124 in the form of a length of angle iron oriented at an angle of approximately forty-five degrees to horizontal at a location above the roll 38 and having one leg secured against, and a second leg extending perpendicular to, the sidewall 22. A flexible shield 126, preferably constructed of a flat, rectangular piece of smooth surface belting, is bolted or otherwise secured to the second leg of the angle member 124 such that a right-hand edge of the shield 126 is engaged with the sidewall 22, a rear end portion is curved upwardly from the angle member and in engagement with an upright run 128 (FIG. 1) of the right-hand belt 42, and a front end portion is curved upwardly from the angle member and in engagement with a filler plate 130, a portion of which also appears in FIG. 7, fixed to the bottom of the sidewall 22 and extending outwardly above, and in sealing engagement with, the longitudinal run 105 of the right-hand belt 42 so as to close a gap 132 defined between the belt run 105 and the sidewall 22. Thus, any stray or rogue pieces of crop that are carried downwardly towards the right-hand spiral ring 110 by the upright run 128 of the right-hand belt 42 are intercepted by the shield 126 and guided past the spiral ring 110 where they are deposited on the belt run 105 and/or the filler plate 130, the latter also functioning to prevent rogue or stray crop stems from interfering with the feeding of the length of net wrap material 78. It is here noted that instead of the two shields 126, a single flexible shield could be used which extends between and is connected to the supports 124. The filler plates 130 also serve to block any air currents, existing between the sidewalls 22, from interfering with the feeding of the length of net wrap material 78. The inner edge of each filler plate 130 is rolled back as at 132 so as to present a rounded edge to the belt run 105 so as to not to damage the belt 42 in the event that the belt fails to track properly and comes into contact with the filler plate inner edge. The filler plates 130 are each provided with upwardly inclined rear and front end portions 134 and 136, respectively, which ensure that the run of belts 105 do not come into contact with end edges of the filler plates 130.

Referring now back to FIG. 3, it can be seen that the spiral ring 110 is offset a distance d outwardly of the spreader ring 112. This creates a favorable lead-in angle which permits longitudinal strands of the length of net material 78 to be engaged and moved outwardly by the spreader ring 112, as is explained in more detail below.

Figure 7:
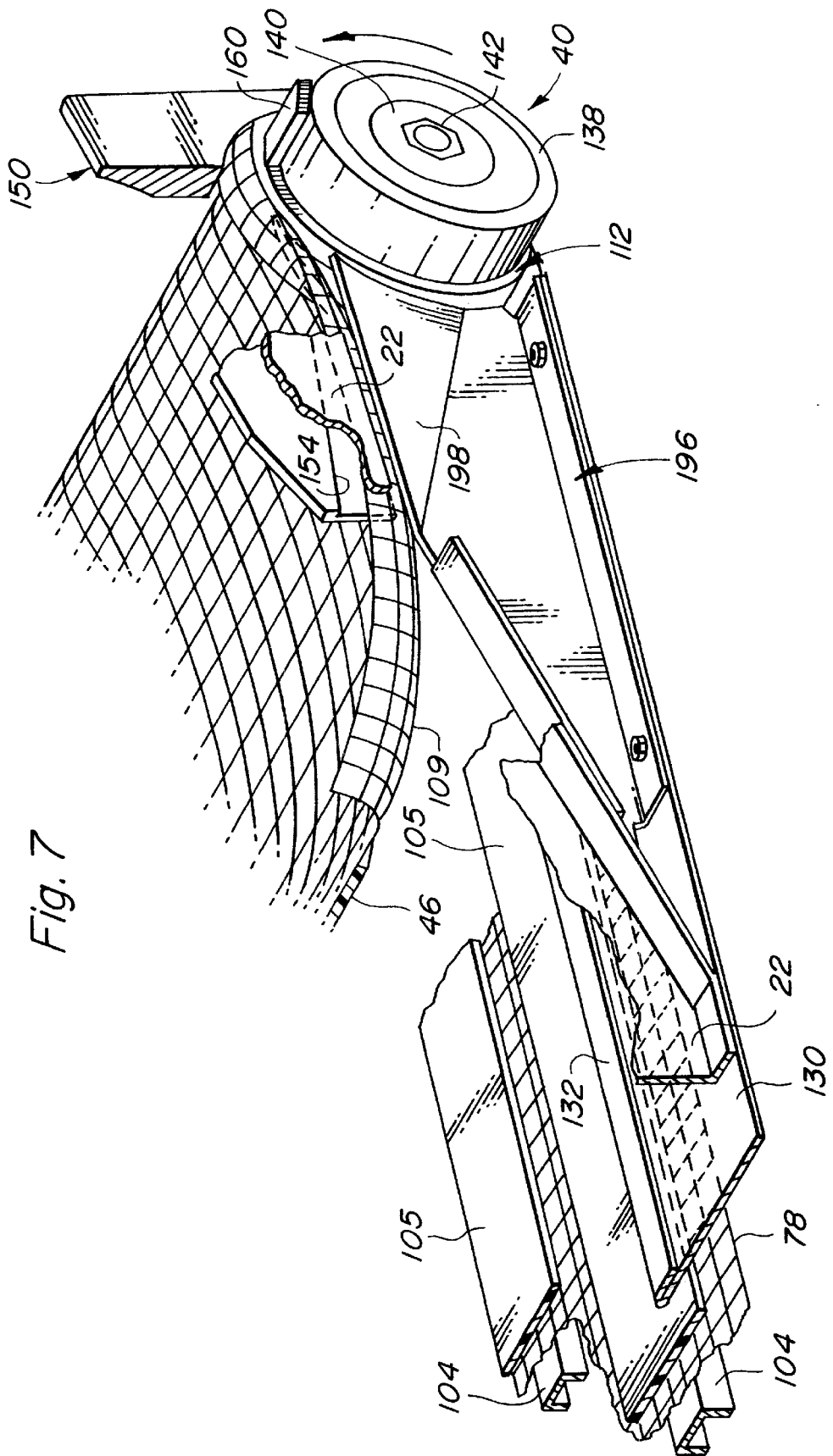
FIG. 7 is a somewhat schematic right rear perspective view of a right, lower front portion of the discharge gate with parts broken away for showing how the net wrap material is supported and guided into the baling chamber.
Figure 8:
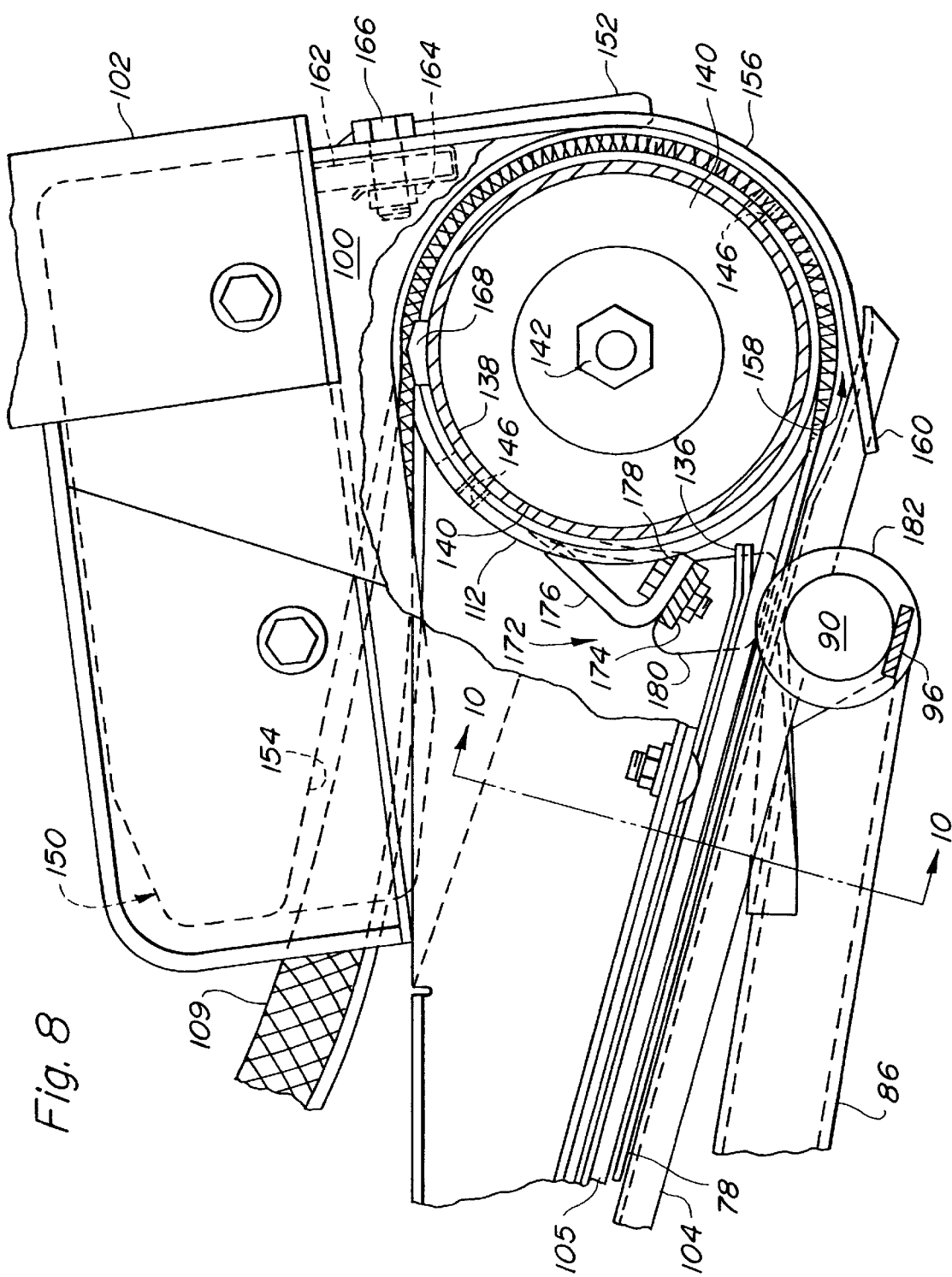
FIG. 8 is a right side elevational view of the lower front portion of a bale discharge gate, with parts broken away, showing the right-hand net wrap material spreader ring and the associated shield for keeping crop from being picked up by the spreader ring, and showing the roll scraper and belt guides.
Figure 9:
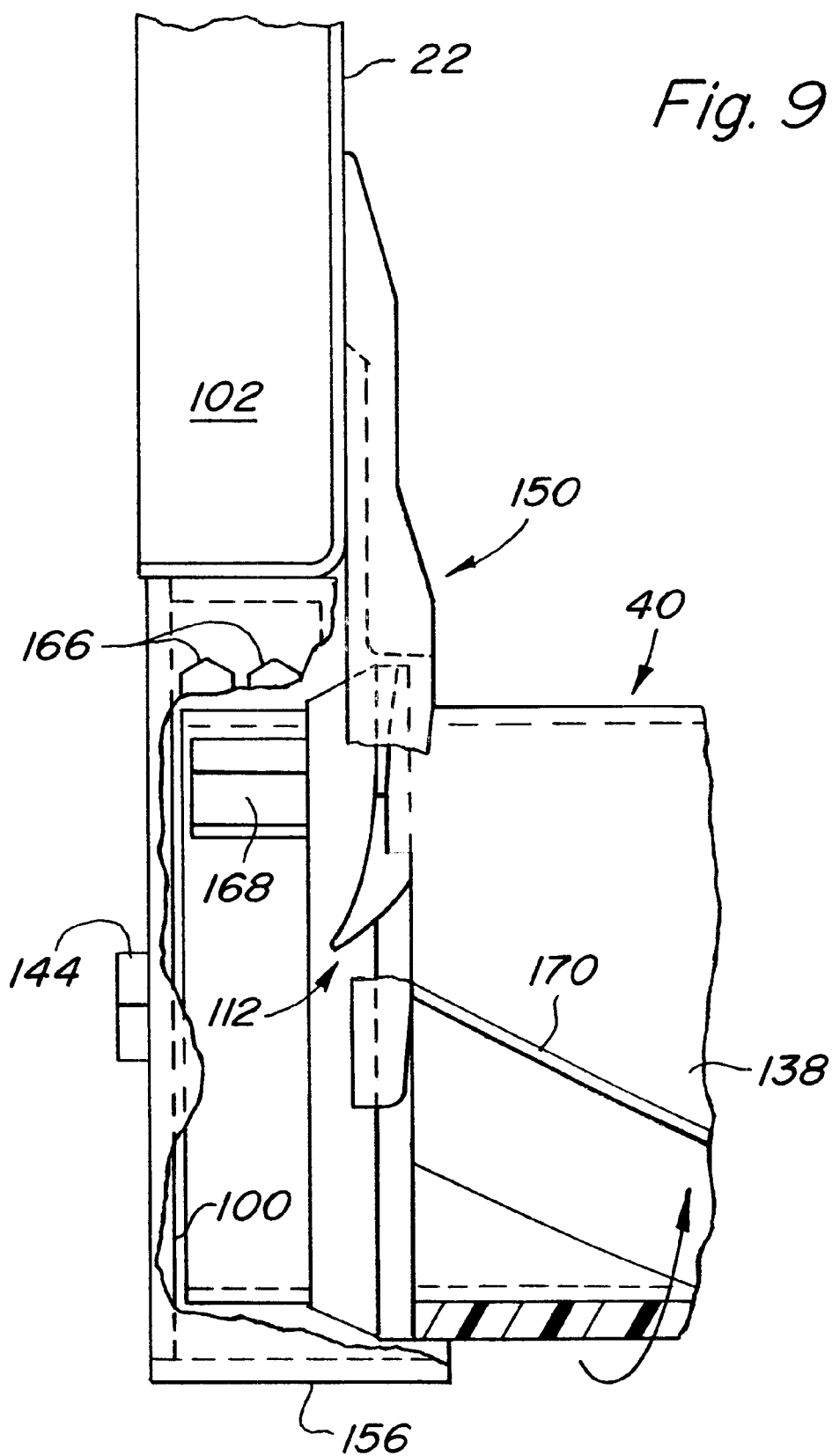
FIG. 9 is a front elevational view, with parts broken away, of the structure shown in FIG. 8.

Referring to FIGS. 7–9, it can be seen that the front gate roll 40 includes a main cylindrical body 138 having opposite end portions that respectively extend beneath the opposite sidewalls 22, the body containing bearings 140, in its opposite ends, having respective inner races secured to a fixed hexagonal through-shaft 142 having its opposite ends tapped and threaded and held in place by respective bolts 144 (FIG. 2) extending through the vertical side plates 100 that form part of support structure fixed to the sidewalls 22. Mounted on the cylindrical roll body 138 so as to respectively extend beneath the right- and left-hand gate sidewalls 22 are the right- and left-hand net wrap material spreader rings 112, with only the right-hand spreader ring being shown. It is to be understood that the left-hand spreader ring is a mirror image of the right-hand spreader ring 112. The spreader ring 112 has an inside diameter close to the outer diameter of the roll body 138 with the spreader ring being held in place by tightening a pair of sets screws 146 (FIG. 8) received in threaded holes 148 (FIGS. 11 and 12) extending radially through the spreader ring 112.

Respectively mounted to lower inside locations of the right- and left-hand sidewalls 22 are right- and left-hand guide plates of which only the right-hand guide plate 150 is shown, with it to be understood that the left-hand guide plate is a mirror image of the guide plate 150. The guide plate 150 includes a lower forward guard portion 152 which is curved about and disposed in spaced relationship to a portion of the spreader ring 112 that is inward of the gate sidewall 22 so as define an annular passage for the length of net material 78 from which incoming crop material is blocked by the guard portion 152. The guide plate 150 includes a generally triangular relief area defined by a step 154 that extends inwardly from an outer surface of, and is inclined to the rear end of, the guide plate 150 from a location near the eleven o'clock position of the roll 40. This relief area cooperates with the baler sidewall 22 to define a passage through which the marginal edge portions of the length of net material 78 pass as the net material is pulled into the baling chamber 56 during wrapping of a bale 58.

The vertical support plates 100, from which the opposite ends of the roll 40 are supported, each have an upright forward edge extending downwardly from the bottom of the support post 102 so as to be just forward of the roll 40, the upright portion, at approximately the three o'clock position of the roll, blending into an arcuate section which continues at a fixed radius about the axis of the roll to about the seven o'clock position of the roll where it straightens and goes rearwardly a short distance, this radius being slightly greater than the radius of the spreader ring 112 of the roll 40. A wrap-around shield 156, which is formed from a J-shaped strap, is disposed for cooperating with the guard portion 152 of the guide plate 150 to block crop material delivered by the pickup 62 from coming into contact with the portion of the spreader ring 112 which is outward of the sidewall 22. To that end, an inner edge of the stem of the J is engaged with an outer surface of the guard portion 152, with an outer margin of the stem overlapping the upright edge of the support plate 100. The hook of the J is formed at a radius such that it fits close about the radiused edge of the support plate 100 and is thus spaced from the spreader ring 112 so as to define an annular space or gap 158 to permit passage of the length of net material 78. This gap 158 is preferably dimensioned so that there is a clearance of approximately 3–6 mm between the outside diameter of the associated spreader ring 112 and the shield 156. The rear end of the shield 156 is angled downwardly, as at 160, to permit a smooth entry of the length of net material 78 into the gap 158. For holding each of the wrap-around shields 156 in place, a mounting tab 162 is located inside an upper forward location of a respective support plate 100 and is welded there and also to the bottom of the sidewall post 102. A pair of u-shaped, sheet metal clip-nuts 164 are received over the bottom edge of the tab 162 and are respectively aligned with a pair of transversely spaced holes provided in the tab. The upper end of the shield 156 is provided with a similarly spaced pair of holes and a pair of screws 166 are received in the aligned holes and screwed into the clip-nuts 164 so as to secure the shield 156 in place.

To prevent rogue crop, i.e., short pieces of stems and the like, from accumulating in the partially enclosed zone about the end of the roll 40 and interfering with the feeding of the length of net material 78 into the baling chamber 56, an axially projecting wiper 168 has its inner edge welded the outer face of the spreader ring 112. The wiper 112 will sweep through the outer portion of the annular space 158 and force any crop pieces located there out over the rear end 160 of the shield 156.

Crop pieces that do not escape from the enclosed volume between the runs of belts 46 and 105, during the time that bales are being formed, i.e., between wrapping operations, are carried by the belts runs 105 to the lower front roll 40. To aid in removing these pieces of crop so that they do not accumulate and cause net feeding problems, the surface of the core 138 of the roll 40 extending between the sidewalls 22 is provided with right- and left-hand spiral strips 170 that are inclined to the axis of the roll 40 such as to cause engaged pieces of crop to be moved away from the spreader rings 112. The outer ends of the spiral strips 170 are respectively engaged flush against a planer inner surface portion of the spreader rings 112, as is described in more detail below, this engagement ensuring that the net material will not be snagged by the outer ends of the strips. Furthermore, the spiral strips 170 tend to cause the belt runs 105 to shake causing the crop pieces to migrate one way or the other towards the gaps defined between adjacent belts. The pieces of crop that are carried about the roll 40 are brought into engagement with a leading end of a stripper or scraper 172, that is defined by an angle member extending lengthwise in parallel relationship to the roll 40 and having its opposite ends, respectively secured to tabs 174 welded to inside surface locations of the opposite side plates 100. The stripper 172 has a first leg 176 angled upwardly and forwardly at an angle of from 40–50° at a location just behind the roll 40, with the leg 176 terminating between the nine and ten o'clock positions of the roll at a radius from the center of the roll which is just larger than that traced by an outer periphery of the spiral strips 170. A second leg 178 of the scraper 172 is angled downwardly and forwardly at an angle of from 25–35° from the horizontal and terminates at distance from the center of the roll 40 which is somewhat greater than that of terminal end of the leg 176. The spiral strips 170 and the stripper leg 176 cooperate to reduce the size of rogue or stray pieces of crop which, when stripped from the roll 40, will slide down the upper surface of the leg 176 and hopefully out through the gaps between the belt runs 105. Any crop pieces which pass beneath the leg 176 will hopefully also pass through the gaps between the belt runs 105, but if these pieces and those stripped by the stripper 172 do not fall through the belt gaps, they will be recirculated about the roll 140 where they will once again be reduced in size by the action of the spiral strips 170 and the stripper leg 176.

Welded to and projecting downwardly from transversely spaced locations along the bottom of the second leg 178 of the stripper 172 are a plurality of generally parallelogram-shaped, flat, center belt guides 180. As can be seen in FIG.

10, these belt guides 180 are respectively located in the gaps between all adjacent pairs of the belt runs 105, except for the outer pair of belt runs 105 at each of the opposite sides of the discharge gate 20. Although respective lower surfaces of the belt guides 180 are shown positioned below the belt runs 105, this is the result of the belt runs 105 being shown thinner, and the length of net material 78 being shown thicker than they actually are in order for the length of net material 78 and its path about the roll 40 to be discernable. In actuality, the bottoms of the center guides 180 terminate approximately 2 mm above the bottoms of the belt runs 105 so as not to impede the passage of the length of net material 78 to the nip formed between the belts 42 and the roll 40. Furthermore, the bottoms of the guides 180 are spaced above the cross member 90 of the net wrap material guide or support 84 by a distance sufficiently less than the thickness of the belt runs 105 such that the latter are prevented from deflecting beneath the guides 180.

Provided for keeping the outer pair of belt runs 105, at each of the opposite sides of the discharge gate 20, from moving sideways into the spreader rings 112 are a pair of washer-like outer belt guides 182 that are received about, and fixed to, the cylindrical cross member 90 of the net wrap material guide or support structure 84. The outer pair of belt guides 182 are respectively located inboard of innermost portions of the spreader rings 112. The outer belt guides 182 respectively extend upwardly between the sidewalls 22 and the outer sides of the outer belt runs 105 and terminate approximately 2 mm below the upper surface of the belt runs 105. The reason for using outer belt guides which project upwardly instead of downwardly beside the belts is because tension in the net causes the net strands to be pulled up against the roll between the outer edge of the outside belt run 105 and the adjacent spreader ring 112 and a downwardly projecting belt guide at the outside of the belt run 105 would act as a wall to keep the net material from reaching the spreader rings 112. However, because the outer belt guides 182 project upwardly between the outer belt runs 105 and the sidewalls 22, the net naturally moves over the top of the guides 182, allowing the net material to be engaged and spread by the spreader rings 112. It is to be noted that the upper surface of the belt guides 182 are respectively spaced below the lower surfaces of the filler strips 130 by amount less than the thickness of the belt run 105 so that the latter is blocked from moving outwardly over the belt guides 182 and into interference with the spreader rings 112.

Referring now also to FIGS. 11 and 12, it can be seen that the exterior surface or outer periphery of the spreader ring 112 includes a constant diameter section 184 which, excluding the wiper 168, has a major width constituting approximately one third of the axial width of the spreader ring 112, with the remaining two-thirds of the axial width of the spreader ring being in the form of a conical section 186 having its large end joined to the outer axial end of the constant diameter section 184. The conical section 186 preferably makes an angle of about 22½° with an axial line at the periphery of the constant diameter section 184, with angles in the range of about 15–30° also being functional. Located at diametrically opposite locations of the spreader ring 112 are wedge-shaped net feed notches or grooves 188, each of which includes first and second converging sides 190 and 192 respectively, which meet to define an included angle of 70° (not shown), with angles in the range of about 50–90° also being functional. The groove first side 190 is located in a first plane which preferably makes an included angle of 30° with a second plane that is located at an inner end of, and disposed perpendicular to the rotational axis of, the spreader ring 112, with angles in the range of about 10°–60° also being functional. Due to the conical portion 186 of the ring 112, the notches 188 become shallower as they extend outwardly and they each terminate about half way across the axial extent of the conical surface 186 so as to be at the surface of the conical portion where they meet at their trailing ends, with respect to the direction of rotation of the ring 112, this direction being clockwise as viewed in FIG. 12. The inner axially facing surface of the ring 112 is provided with two lead-in surface sections 194 which, relative to the direction of rotation of the ring, respectively lead the notches 188. Specifically, each lead-in surface section 194 gradually tapers by a distance of 6 mm through an arc of 123° from a leading end at location of maximum width of the constant diameter section 184, to a trailing end of the lead-in surface, which terminates at a minimum width location of the section 184 at the side 192 of the notch 188 at a location along a diameter of the ring 112 which leads the leading end of the side 190 by 4.5°. The lengths of the lead-in surfaces 194 could be somewhat shorter or longer and still work satisfactorily, for example, an arc in the range of about 45°–170° could be used. Thus, the longitudinal strands of the stretched length of net material 78 will be led, in this particular case, to a location of the notch side wall 190 which is 6 mm axially within each of the notches 188 so as to be guided thereby over the ramped surface 186.

Trailing each of the notches 188 of each spreader ring 112 and extending over an arc of approximately 55° is a flat or planar, vertical innermost surface 195 that is disposed at a right angle to the axis of rotation of the reader ring 112. The outer end of the adjacent spiral strip 170 is engaged with one of the surfaces 195 so that no gap exists between the spreader rings 112 and spiral strips 170. Another function of the surfaces 195 of each spreader ring 112 is to act as a belt guide which engages the outer side of the adjacent belt run 105 so as to keep the belt from running into the notches 188.

It is to be noted that while two notches 188 are shown, a single notch, or more than two notches could be used and that angular length of the lead-in surface or surfaces to the notch or notches may be other than 123° and still function satisfactorily.

Referring once again to FIG. 3, it will be appreciated that because the spiral rings 110 are located outwardly of the spreader rings 112, the feeding of the longitudinal strands of the length of net material 78 into the notches 188 will be enhanced. Because of the ramped part 186 of the spreader ring 112, the tensioned net will have a tendency to remain spread out. So that transverse strands of the net material 78 are not snagged and possibly cut by an edge 194 defined where the wall 190 of each notch 188 intersects the inner face of the spreader ring 112, each edge 194 is inclined so as to trail a radial line intersecting an inner end of the edge 194 by about 4.5°, with greater angles also working satisfactorily.

Referring now back to FIGS. 7 and 8, it can be seen that a plate 196, which is generally triangular in side view, is used to fill an area located below the sidewall 22 and rearward of the roll 40. This plate 196 includes a triangular guide or deflector portion 198 that is bent outward from the plane of the sidewall 22, with a forward end of the deflector portion 198 engaging, or at least being in close spaced relationship to, the conical surface 186 of the spreader ring 112 at a location which is near the eleven o'clock position of the roll 40, as viewed in FIG. 8. From its location adjacent the conical surface 186, the forward end of the deflector portion 198 curves downwardly and inwardly about the spreader ring 112. Thus, the deflector portion 198 defines an rdly facing, angled surface which provides a space for accommodating the outer marginal portions 109 of the length of net material 78, and acts to guide pieces of rogue crop towards the top of the inner belt run 105 so as to pass into the nip between the belt run and the roll 40.

The operation of the baler 10, as concerns the feeding of the length of net material 78 into the baling chamber 56 is here stated. Assuming that a bale 58 has just been formed in the baling chamber 56 and it is desired to wrap the same with net material, the drive to the feed rolls 74 and 76 of the net wrapping mechanism 70 will be activated so as to cause the length of net material 78 to be propelled against the upright runs 128 of the belts 42 extending between the upper rear gate roll 36 and the lower rear gate roll 38. These belt runs 128 will carry the net material 78 downwardly to the nip 80 formed between the guide pan 82 and the belt runs 128 at the roll 38. The net material 78 is wider than the baling chamber 56 and the leading end 120 of the spiral flighting of spiral rings 110 located at the opposite ends of the roll 38 will aggressively engage and lift the longitudinal strands of the net material so as to spread the net outwardly to its full width, this aggressiveness being enhanced by the fact that the surface speed of the spirals is greater than the linear speed of the belt runs 105, and hence, greater than the linear speed of the length of net material 78. The fore-and-aft extending runs 105 of the belts 42 will engage the net material 78 and carry it along the net guide surfaces defined by the tops of the channels 104 of the guide structure 84, the net material entering the nip formed between the bale-forming belts and the roll 40, in the middle area of the roll 40, and the annular space 158 between the wrap-around shield 156 and the spreader rings 112 at the opposite ends of the roll 40. As the length of net wrap material 78 reaches the top of the roll 40, it will be caught between the belts 42 and the bale 58, the latter having a circumferential speed which is faster than the speed at which the material is passing through the feed rolls 74 and 76. Thus, the bale 58 and belts 42 place the net material 78 in tension as it is pulled into the baling chamber 56. This tension will have the effect of causing the width of the net material 78 to have a tendency to become narrower than the width of the baling chamber 56. Operating in conjunction with the spiral rings 110 so as to ensure that the net material 78 is at a width greater than that of the baling chamber 56 just prior to entering the baling chamber are the spreader rings 112.

Specifically, with reference to the disclosed right-hand spreader ring 112, the right-hand marginal portion of the tensioned length of net material 78 will come into engagement with the notches 188 as the length of material passes about the roll 40. The angled sides 190 of the notches will engage longitudinal strands of the length of net material 78 and move them outwardly onto the conical portion 186 of the spreader ring 112, this conical portion acting to retain the strands once placed there so that the net material 78 is spread to a width greater than that of the baling chamber 56 before it enters the chamber. The engagement of the notches 188 with the longitudinal strands of the net material is aided by the fact that the spiral rings 110 of the lower rear gate roll 38 are outward of the spreader rings 112, and also by the lead-in surfaces 114 formed at the inner face of the constant diameter section 104 of the spreader rings 112 so that the axial dimension of the section 184 gradually diminishes through an arc of approximately 123°. The net retaining or holding function of the conical surface portion 186 will be satisfactorily performed if the surface portion 186 makes an angle of at least 15° with a line parallel to the axis of the ring 112.

Once the net material 78 advances just beyond the top of the roll 40, the marginal net material portions 109 which extend outwardly beyond the sidewalls 22 will be drawn into the baling chamber 56 through the channel defined between that portion of the guide plate 150 below the step 154 and the sidewalls 22, with the marginal portions then being placed over the ends of the bale 58, as shown in FIG. 1

Various structures serve to prevent rogue or stray pieces of crop from interfering with the spreading and feeding of the length of net material 78 as it passes from the lower rear gate roll 38 to the lower front gate roll 40 and on into the baling chamber 56. Specifically, the flexible shields 126 that are located inside gate sidewalls 22 and angled above the lower rear gate roll 38 serve to intercept pieces of crop carried downwardly by the upright rear run of belts 128, with the intercepted crop pieces sliding down the angled shields 126 to the tops of the filler plates 130. These pieces of intercepted crop are thus prevented from exiting the discharge gate 20 in the vicinity of the spiral rings 110 and, thus, are prevented from interfering with the feeding and spreading of the net material in those areas. Of specific concern are large pieces of stems from corn or cane which can cause the net material to be torn as well as prevented from spreading to its full width.

The filler plates 130 respectively span the gaps between the opposite sidewalls 22 and the outer belt runs 105 so as to prevent crop pieces from exiting the baling chamber along the sidewalls 22 so as to interfere with the feeding of the net material 78. The filler plates 130 also serve to prevent air currents generated by the operation of the belts 42 from interfering with the passage of the net material. Crop pieces that accumulate on the filler plates 130 eventually move inwardly where they either fall between the gaps between adjacent belt runs 105, when no net is present, or are carried forwardly into the nip between the belts and the lower front gate roll 40. There, these crop pieces, as well as any other crop pieces that are brought forwardly by the belt runs 105, are engaged by the spiral strips 170 of the roll 40 and carried inwardly away from the spreader rings 112 at the ends of the gate roll 40 and about the roll 40 into engagement with the leg 176 of the stripper or scraper 172 where the crop pieces are broken into smaller pieces. These smaller pieces either slide down the outside of the stripper leg 176 and away from the roll 40 or down the inside of the stripper leg 178 and toward the roll 40. In either event, the crop pieces either pass between the gaps of the belt runs 105 or are recirculated about the roll 40 where they are once again reduced in size by the action of the spiral strips 170 against the end of the stripper leg 176. Significant in aiding the movement of the pieces of crop so that they fall between the belt runs 105 is the shaking action imparted to the belt runs 105 by the spiral strips 170.

Also acting to prevent crop material from disturbing the proper feeding of the length of net material are the wrap-around shields 156, which extends forwardly of and wrap about the spreader rings 112 at the opposite ends of the lower gate roll 40. The source of this crop is that being delivered to the baling chamber inlet 60. It is noted that unless intercepted, crop stems, particularly large hard stems, can get carried by the spreader ring notches 188 to the guide plates 150 and become wedged tightly, causing wear and/or heat build-up. This wedged crop also interferes with the path of the net material, e.g., it can push the net material inward and prevent the net from going over the end or edge of the bale. The net material 78 enters from the rear of the shield 156 and passes through the gap 158 defined between the shield 156 and the roll 40.

The wiper 168, carried by the spreader ring 112, acts to keep any small pieces of crop, which finds its way into the gap, loose and wiped out of the area and thus helps to prevent crop from being packed tightly between the spreader ring 112 and the shield 156 and/or guide plate 150. In addition to the wiper 168 acting to keep crop from accumulating in the vicinity of the spreader ring 112, the angled deflector portion 198 of the plate 196 also serves to prevent such accumulation by guiding small pieces of crop into the nip point between the gate roll 40 and the belts baling chamber 56 by way of the net material passage defined by the guide plate 150 and sidewall 22.

Contributing to the proper spreading of the length of net material 78 by the spreader rings 112 are the outer belt guides 182 which extend upwardly between each outer pair of belt runs 105 so as to permit the net material 78 to take a natural path above the guides 182 when the material 78 is tensioned and pulled upwardly as it is being pulled into the baling chamber by the action of a rotating bale.

Thus, it will be appreciated that reliable feeding of net wrap material, that is wider than the baling chamber, into the baling chamber in such a way that the net material extends over the opposite ends of the bale requires the cooperation of various elements to ensure that the material is spread to a width greater than that of the baling chamber prior to it entering the baling chamber, and that pieces of stray or rogue crop are kept from interfering with the spreading and feeding of the net material.

What is claimed is:

1. In a large round baler including a bale-forming chamber having opposite sidewalls and a transverse opening extending the full width of said chamber between said sidewalls, said bale-forming chamber including a rotating element having an arcuate profile defining one side of said opening and including a rotatable roll having opposite ends extending outwardly beyond said opposite sidewalls, a net wrapping mechanism adapted for introducing net material, having a width greater than the distance between said opposite sidewalls, over said roll and through said opening for introduction into a nip defined by a rotating bale just formed in the chamber and said arcuate profile, whereby the net material will be carried into said bale-forming chamber, a pair of bale end engaging structures respectively extending inwardly from vertical, planar inner surface portions of said opposite sidewalls in the vicinity of said roll, each bale end engaging structure having a leading and a trailing edge relative to the direction of rotation of a bale in said chamber, a passage leading from a location outward of a given sidewall adjacent the roll to a location inwardly of said given sidewall adjacent the trailing edge of the adjacent bale end engaging structure, and a pair of net spreader elements being carried by said roll respectively in bridging relationship to said opposite sidewalls, the improvement comprising: said pair of net spreader elements each including a spreader ring including at least one wedge-shaped notch having first and second sides converging outwardly from an inner end of said notch; said first side of said notch trailing said second side when considered relative to a direction of rotation of said roll during normal operation and being located for engaging longitudinal strands of outer marginal portions of said net material at or inside said planar inner surface of the adjacent sidewall and angled outwardly for moving these strands outwardly of said inner surface, whereby the net material is spread to a width greater than that of said bale-forming chamber.

2. The baler defined in claim 1 wherein each spreader ring is provided with more than one notch with the notches being spaced angularly from each other.

3. The baler defined in claim 1 wherein each spreader ring includes an inner constant diameter portion joined to an outer conical portion, with the diameter of the conical portion decreasing outwardly; and said at least one notch extending partly into a surface area of said conical portion, whereby said notch is adapted for guiding net material outwardly over said conical portion, where, due to tensile forces in the net material, it will remain on the conical portion until pulled into the bale-forming chamber by a rotating bale being wrapped.

4. The baler defined in claim 1 wherein each notch first side lies in a plane which forms an angle in the range of approximately 10–50° with a plane extending perpendicular to a rotational axis of said roll.

5. The baler defined in claim 1 wherein said at least one notch extends to an inner side of an associated one of the spreader rings; and said inner side defining an inwardly facing lead-in surface which is shaped such that the width of said spreader ring diminishes from a first location which leads said notch, when considered relative to said direction of rotation of the roll during normal operation, to a second location within said notch.

6. The baler defined in claim 5 wherein said lead-in surface extends through an arc in a range from 45 to 170°.

7. The baler defined in claim 1 wherein said first and second sides of said notch converge to form a bottom of said notch and so as to make an included angle in a range of about 50–90°.

8. The baler defined in claim 1 wherein a vertical support plate is located closely adjacent each outer end of said roll; each spreader ring being spaced inwardly on said roll from an adjacent outer end thereof; and a shield extending downwardly in front and extending around a lower portion of said spreader ring in spaced relationship to the spreader ring and roll for defining an arcuate space about said roll, with the shield having a rear end defining an opening through which net material may pass to said space on its way to the baling chamber.

9. The baler defined in claim 8 wherein a wiper element is fixed to, and projects outwardly from an outer end location of each spreader ring for sweeping said space, about the circumference of that portion of the roll located outwardly of the adjacent spreader ring, so as to engage rogue pieces of crop located in said space and expel the same behind said rear end of said shield.

10. The baler defined in claim 1 wherein said rotatable roll is a bale-forming belt support roll mounted for rotation about a horizontal transverse axis and said arcuate profile is defined by a plurality of bale-forming belts supported in side-by-side relationship across a central portion of said support roll; a guide plate being positioned behind said support roll and below each sidewall in the vicinity of the bale end engaging structure associated with the sidewall; said guide plate including a guide portion inclined outwardly from said sidewall across and in close proximity to the adjacent spreader ring, the guide portion being so located that pieces of crop material carried by said at least one notch will be directed onto an outer one of said bale-forming belts so as to be carried towards a second nip formed between said support roll and bale-forming belts.

11. The baler defined in claim 1 wherein said rotatable roll is a bale-forming belt support roll mounted for rotation about a horizontal transverse axis and said arcuate profile is defined by a plurality of bale-forming belts supported in side-by-side relationship across a central portion of said support roll; and each spreader ring being provided with a vertical planar innermost surface disposed perpendicular to said axis, with said innermost surface being located adjacent a path traveled by an outer one of said bale-forming belts so that said innermost surface acts as a belt guide preventing the belt from entering said at least one notch of said spreader ring.

* * * * *